(12) United States Patent
Stoicescu

(10) Patent No.: US 12,071,898 B2
(45) Date of Patent: Aug. 27, 2024

(54) FLUID PUMP SYSTEMS

(71) Applicant: Hamilton Sundstrand Corporation, Charlotte, NC (US)

(72) Inventor: Adrian L. Stoicescu, Roscoe, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 145 days.

(21) Appl. No.: 17/390,638

(22) Filed: Jul. 30, 2021

(65) Prior Publication Data

US 2023/0034465 A1 Feb. 2, 2023

(51) Int. Cl.

| | |
|---|---|
| *F02C 7/236* | (2006.01) |
| *F02C 7/232* | (2006.01) |
| *F02C 9/30* | (2006.01) |
| *F04D 1/06* | (2006.01) |
| *F04D 1/10* | (2006.01) |
| *F04D 9/04* | (2006.01) |
| *F04D 13/12* | (2006.01) |
| *F04D 15/00* | (2006.01) |
| *F04D 15/02* | (2006.01) |

(52) U.S. Cl.
CPC ............ *F02C 7/236* (2013.01); *F02C 7/232* (2013.01); *F02C 9/30* (2013.01); *F04D 1/06* (2013.01); *F04D 1/10* (2013.01); *F04D 13/12* (2013.01); *F04D 15/0072* (2013.01); *F04D 9/04* (2013.01); *F04D 15/0218* (2013.01)

(58) Field of Classification Search
CPC .......... F02C 7/232; F02C 7/236; F02C 9/263; F04D 13/12; F04D 13/14; F04D 25/0072
See application file for complete search history.

(56) References Cited

U.S. PATENT DOCUMENTS

| 3,576,375 | A | * | 4/1971 | Jackson | F04D 29/20 |
| | | | | | 415/18 |
| 3,614,269 | A | * | 10/1971 | Lanctot | F02C 7/236 |
| | | | | | 417/427 |
| 3,658,440 | A | * | 4/1972 | Jackson | F02C 7/236 |
| | | | | | 415/157 |
| 3,784,329 | A | * | 1/1974 | Crawley | F02C 7/236 |
| | | | | | 417/252 |
| 9,316,157 | B2 | * | 4/2016 | Ripley | F02C 7/32 |
| 10,138,816 | B2 | * | 11/2018 | Yates | F04B 41/06 |

(Continued)

FOREIGN PATENT DOCUMENTS

GB 1406245 A 9/1975

OTHER PUBLICATIONS

Extended European Search Report of the European Patent Office, mailed on Dec. 12, 2022, in corresponding European Patent Application No. 22187759.0.

*Primary Examiner* — David E Sosnowski
*Assistant Examiner* — Jackson N Gillenwaters
(74) *Attorney, Agent, or Firm* — Bachman & LaPointe, P.C.

(57) ABSTRACT

A multi-stage fluid pump system can include a first stage configured to provide a first pressure and a second stage configured to provide a second pressure. The pump system can be configured to prevent output of the second stage in a first stage mode such that only the first pressure is output from the first stage and second stage and to allow output of the second stage in a multi-stage mode such that there is a combined pressure output from the first stage and the second stage.

16 Claims, 7 Drawing Sheets

2 Stage Operating Mode

Dry 2nd Stage at Idle and Cruise

(56) References Cited

U.S. PATENT DOCUMENTS

| | | | |
|---|---|---|---|
| 11,629,643 B1* | 4/2023 | Susca | F02C 7/228 60/206 |
| 2018/0050812 A1* | 2/2018 | Ribarov | F02C 7/236 |

* cited by examiner

2 Stage Operating Mode

Dry 2nd Stage at Idle and Cruise

Dry 2nd Stage at Idle and Cruise

FLUID PUMP SYSTEMS

FIELD

This disclosure relates to fluid pump systems (e.g., for fuel systems).

BACKGROUND

Existing gear pumps are heavy, expensive, not reliable, and are not long lasting enough for aerospace applications (e.g., in fuel systems), for example. But these types of pumps allow one to control output of the positive displacement pump to a desired amount. Because of this, traditional aircraft engines exclusively use positive displacement pumps as the main fuel/actuation flow pump as there has traditionally been no better alternative considering weight, cost, complexity, etc.

Centrifugal pumps are simpler and lighter than positive displacement pumps, but provide pressure strictly as a function of speed. While such pumps are able to produce sufficient flow at high speeds for fuel to engine, traditional centrifugal pumps are not useful as a main pump for starting an engine (e.g., an aircraft turbomachine) or in low power settings because traditional centrifugal pumps cannot produce enough pressure at low speeds. In order to make a centrifugal pump provide sufficient flow for all phases of operation, traditional centrifugal pumps must be oversized to a point that is not useful (e.g., for aircraft). Accordingly, traditional aircraft engines use positive displacement pumps exclusively, and centrifugal pumps have been considered incapable for us as a main fuel pump because of their inability to start an engine at cranking speed (e.g., ~8% of rated). Since the pressure output of a centrifugal pump is proportional to high speed spool speed (N2), at 8% cranking speed a practically sized centrifugal pump does not put out sufficient pressure for the engine to start, and a sufficiently sized centrifugal pump produces unnecessary pressure at high speed (which would draw excess input power as well). Conventional methods and systems have generally been considered satisfactory for their intended purpose. However, there is still a need in the art for improved fluid pump systems. The present disclosure provides a solution for this need.

SUMMARY

A multi-stage fluid pump system can include a first stage configured to provide a first pressure and a second stage configured to provide a second pressure. The pump system can be configured to prevent output of the second stage in a first stage mode such that only the first pressure is output from the first stage and second stage and to allow output of the second stage in a multi-stage mode such that there is a combined pressure output from the first stage and the second stage.

The system can be configured to reduce or eliminate a resistance provided by the second stage in the first stage mode. For example, the system can be configured to dry out the second stage in the first stage mode to reduce or eliminate fluid drag on the second stage.

In certain embodiments, the first stage and the second stage can be driven by a common shaft. The first stage can be a centrifugal pump. The second stage can also be a centrifugal pump. In certain embodiments, the first stage can be upstream of the second stage.

The system can include an inlet shutoff valve downstream of the first stage between a first stage outlet and a second stage inlet. The inlet shutoff valve can be configured to block flow to the second stage inlet in the first stage mode, and to allow the flow to the second stage in the multi-stage mode.

The system can include a first check valve disposed downstream of the first stage at the first stage outlet between the first stage and a main discharge line. The first check valve can be configured to open in the first stage mode to allow the first stage to output flow to the main discharge line, and to be closed in the multi-stage mode to prevent flow to the main discharge line from the first stage.

The system can include a second check valve disposed downstream of the second stage at a second stage outlet between the second stage and the main discharge line. The second check valve configured to open in the multi-stage mode to allow the second stage to output flow to the main discharge line, and to be closed in the first stage mode to prevent fluid communication between the second stage and the main discharge line.

The inlet shutoff valve can be a pressure actuated valve having a first side where flow passes through and a second side where control pressure is received. The system can further include a solenoid valve in fluid communication with the first stage outlet to selectively communicate the first pressure to the second side of the inlet shutoff valve to close the inlet shutoff valve. The inlet shutoff valve can be configured to close when the first pressure is applied to a second side.

The system can include a control module operatively connected to the solenoid valve to control the solenoid valve. The control module can thus indirectly control a position of the inlet shut off valve.

The system can include a bleed path in fluid communication with the second stage to drain the second stage in the first stage mode. The system can further include an ejector pump in fluid communication between the first stage and a main inlet line. The bleed path can be in fluid communication with a negative pressure port of the ejector pump to dry out the second stage.

In certain embodiments, the system can include a boost pump upstream of a first stage inlet to boost an inlet flow pressure to the first stage. Any other suitable fluid circuit components (e.g., for fuel circuits) are contemplated herein.

In accordance with at least one aspect of this disclosure, a fuel system for an aircraft can include a multi-stage fluid pump system as disclosed herein, e.g., as described above. The fuel system can include any other suitable components as appreciated by those having ordinary skill in the art in view of this disclosure.

In accordance with at least one aspect of this disclosure, a non-transitory computer readable medium can have computer executable instructions configured to cause a computer to perform a method. The method can include opening an inlet shut off valve directly or indirectly to cause multi-stage pumping in a multi-stage mode in a first operating condition, closing the inlet shut off valve directly or indirectly to prevent at least a second stage from pumping but to continue to allow first stage pumping in a first stage pumping mode, and keeping the inlet shut valve closed to cause draining of at least the second stage to reduce or eliminate fluid drag on the second stage.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1A:
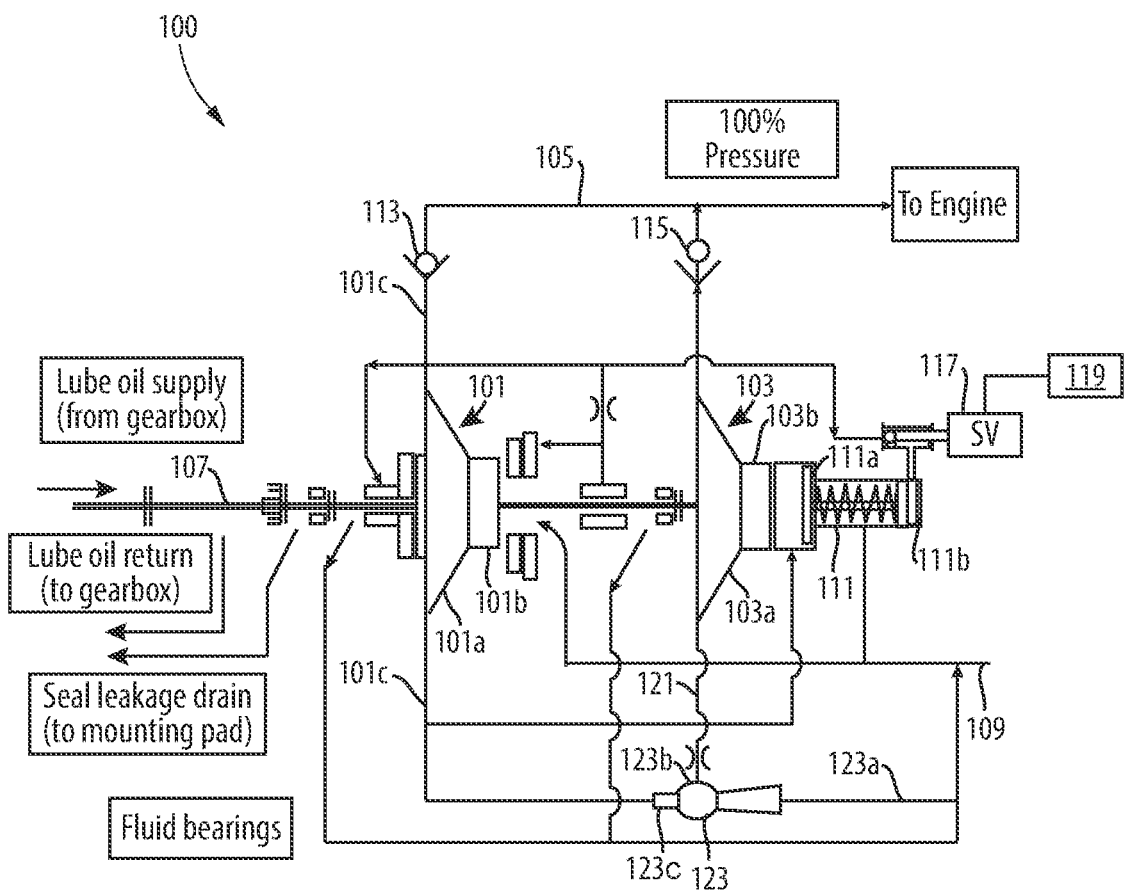
FIG. 1A is a schematic view of an embodiment of a system in accordance with this disclosure, showing operation in a multi-stage mode.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1A and is designated generally by reference character 100. Other embodiments and/or aspects of this disclosure are shown in FIGS. 1B-5. Certain embodiments described herein can be used to pump fuel for aircraft engines (e.g., turbomachines) or any other suitable use.

Figure 1B:
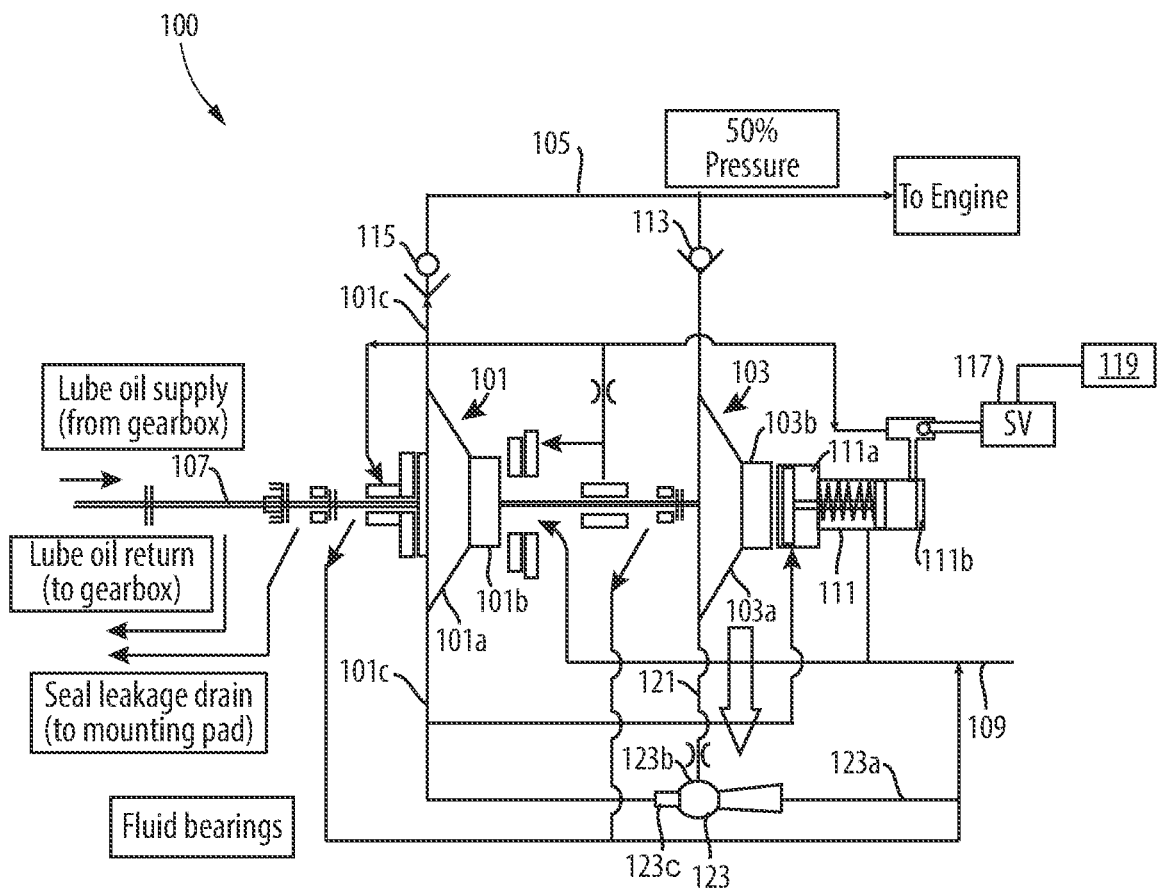
FIG. 1B is a schematic view of the embodiment of FIG. 1A, showing a first stage mode operation.

Referring to FIGS. 1A and 1B, a multi-stage fluid pump system 100 can include a first stage 101 configured to provide a first pressure and a second stage 103 configured to provide a second pressure. The pump system 100 can be configured to allow output of the second stage 103 in a multi-stage mode (e.g., as shown in FIG. 1A) such that there is a combined pressure output from the first stage 101 and the second stage 103 (e.g., the total pressure on the main discharge line 105 is the first pressure plus the second pressure). The pump system 100 can also be configured to prevent output of the second stage 103 in a first stage mode (e.g., as shown in FIG. 1B) such that only the first pressure is output from the first stage and second stage (e.g., such that the total pressure on the main discharge line 105 is the first pressure).

The first stage mode, e.g., as shown in FIG. 1B, can be a single stage mode. However, it is contemplated that any suitable number of additional stages can be utilized and can be configured to always supply pressure or to be selectively capable of supplying pressure similar to the second stage 103. Any suitable arrangement and any suitable number of modes (e.g., single, double, triple, etc.) of operation of any suitable combination of stages is contemplated herein.

The system 100 can be configured to reduce or eliminate a resistance provided by the second stage 103 in the first stage mode. For example, as shown in FIG. 1B, the system 100 can be configured to dry out the second stage 103 in the first stage mode to reduce or eliminate fluid drag on the second stage 103.

In certain embodiments, the first stage 101 and the second stage 103 can be driven by a common shaft 107. The first stage 101 can be a centrifugal pump 101a. The second stage can also be a centrifugal pump 103a. The first stage 101 and the second stage 103 can be the same size pumps (e.g., such that the first pressure and the second pressure are about equal, and each is about 50% of the total output). However, the first stage 101 and the second stage 103 can be different sizes, and any suitable size difference is contemplated herein (e.g., the first stage can be minimized for the flow requirements for cruise power settings, and the second stage can be sized such that total flow of both stages is minimized for maximum power flow, e.g., for takeoff).

In certain embodiments, the first stage 101 can be upstream of the second stage 103 as shown. For example, a main inlet line 109 (e.g., connected to a fluid source such as a fuel tank) can be in fluid communication with the first stage 101, e.g., at a first stage inlet 101b as shown.

The system 100 can include an inlet shutoff valve 111 downstream of the first stage 101 between a first stage outlet 101c and a second stage inlet 103b. The inlet shutoff valve 111 can be configured to block flow to the second stage inlet 103b in the first stage mode (e.g., as shown in FIG. 1B), and to allow the flow to the second stage 103 in the multi-stage mode (e.g., as shown in FIG. 1A).

The system 100 can include a first check valve 113 disposed downstream of the first stage 101 at the first stage outlet 101c between the first stage 101 and a main discharge line 105. The first stage outlet 101c can include any suitable number of common or separate flow paths (e.g., one, two, etc.) and is not limited to only a single flow path 101c. The first check valve 113 can be configured to open in the first stage mode (e.g., as shown in FIG. 1B) to allow the first stage 101 to output flow (e.g., directly) to the main discharge line 105. The first check valve 113 can be configured to be closed in the multi-stage mode (e.g., as shown in FIG. 1A) to prevent flow to the main discharge line 105 from the first stage 101 (e.g., directly from the first stage 101, but causing flow indirectly through the second stage 103 and/or other suitable stages).

The system 100 can include a second check valve 115 disposed downstream of the second stage 103 at a second stage outlet 103c between the second stage 103 and the main discharge line 105. The second check valve 115 can be configured to open in the multi-stage mode (e.g., as shown in FIG. 1A) to allow the second stage 103 to output flow to the main discharge line 105 (e.g., directly from the second stage outlet 103c). The second check valve 115 can be configured to be closed in the first stage mode (e.g., as shown in FIG. 1B) to prevent fluid communication between the second stage 103 and the main discharge line 105.

As shown, in certain embodiments, when the in the multi-stage mode, the second check valve 115 can be open while the first check valve 113 is closed. In certain embodiments as shown in FIG. 1A, in the multi-stage mode, the higher total pressure output by the second stage 103 urges the first check valve 113 shut since the pressure acting on the pump side of the first check valve 101c is only the first pressure. In certain embodiments as shown in FIG. 1B, in the first stage mode, the second stage 103 does not output a pressure when drained, and thus the second check valve 115 stays closed as the first check valve 113 (without a higher pressure on the main discharge line 105) opens allowing the first pressure onto the main discharge line 105, which biases the second check valve 115 closed.

The inlet shutoff valve 111 can be a pressure actuated valve, e.g., as shown, having a first side 111*a* where flow passes through (to the second stage inlet 103*b*) and a second side 111*b* where control pressure is received (e.g., from the first stage outlet 101*c*). In certain embodiments, the system 100 can further include a solenoid valve 117 in fluid communication with the first stage outlet 103*c* to selectively communicate the first pressure to the second side 111*b* of the inlet shutoff valve 111 to close the inlet shutoff valve 111. The inlet shutoff valve 111 can be configured to close when the first pressure is applied to the second side 111*b*, e.g., as shown in FIG. 1B.

The system 100 can include a control module 119 operatively connected to the solenoid valve 117 to control the solenoid valve 117. The control module 119 can thus indirectly control a position of the inlet shut off valve 111. The control module 119 can include any suitable hardware and/or software module(s) configured to control the solenoid valve 117. The control module 119 can be connected to any other suitable component for control thereof (e.g., directly to an electrically operated shutoff valve).

The system 100 can include a bleed path 121 in fluid communication with the second stage 103 to drain the second stage 103 in the first stage mode. The system 100 can further include an ejector pump 123 in fluid communication between the first stage 101 and a main inlet line 109 (e.g., to receive the first pressure to drive the ejector pump 123). The bleed path 121 can be restricted by an orifice (e.g., as shown) to reduce the leakage flow when the second stage is wet. The bleed path 121 can be in fluid communication with a negative pressure port 123*b* of the ejector pump 123 to dry out the second stage 103 (e.g., to suck fuel from the second stage 103 in the first stage mode). The inlet port 123*c* can be a nozzle that receives motive flow from the first stage and can control the amount of flow used. In certain embodiments, the ejector pump 123 can be used to evacuate the second stage to vacuum and fuel vapor with no liquid left behind such that the power draw of that stage drops to virtually nothing.

Figure 2A:
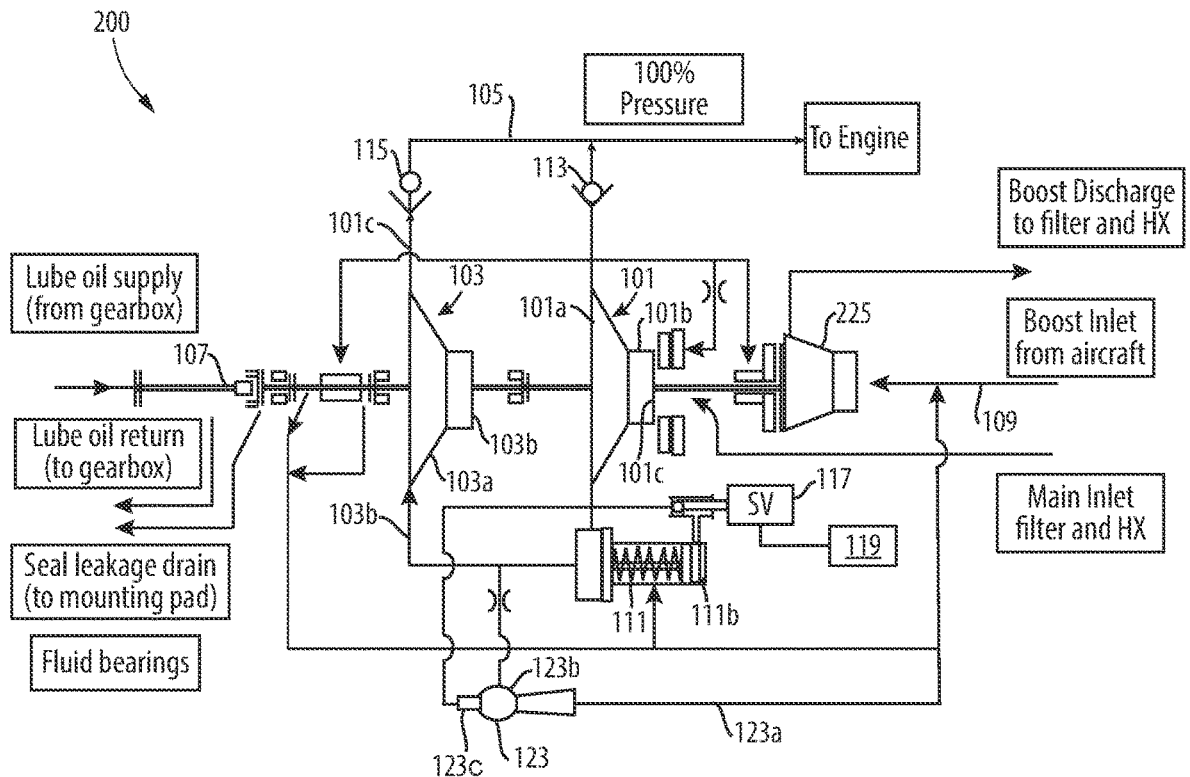
FIG. 2A is a schematic view of an embodiment of a system in accordance with this disclosure, showing operation in a multi-stage mode.
Figure 2B:
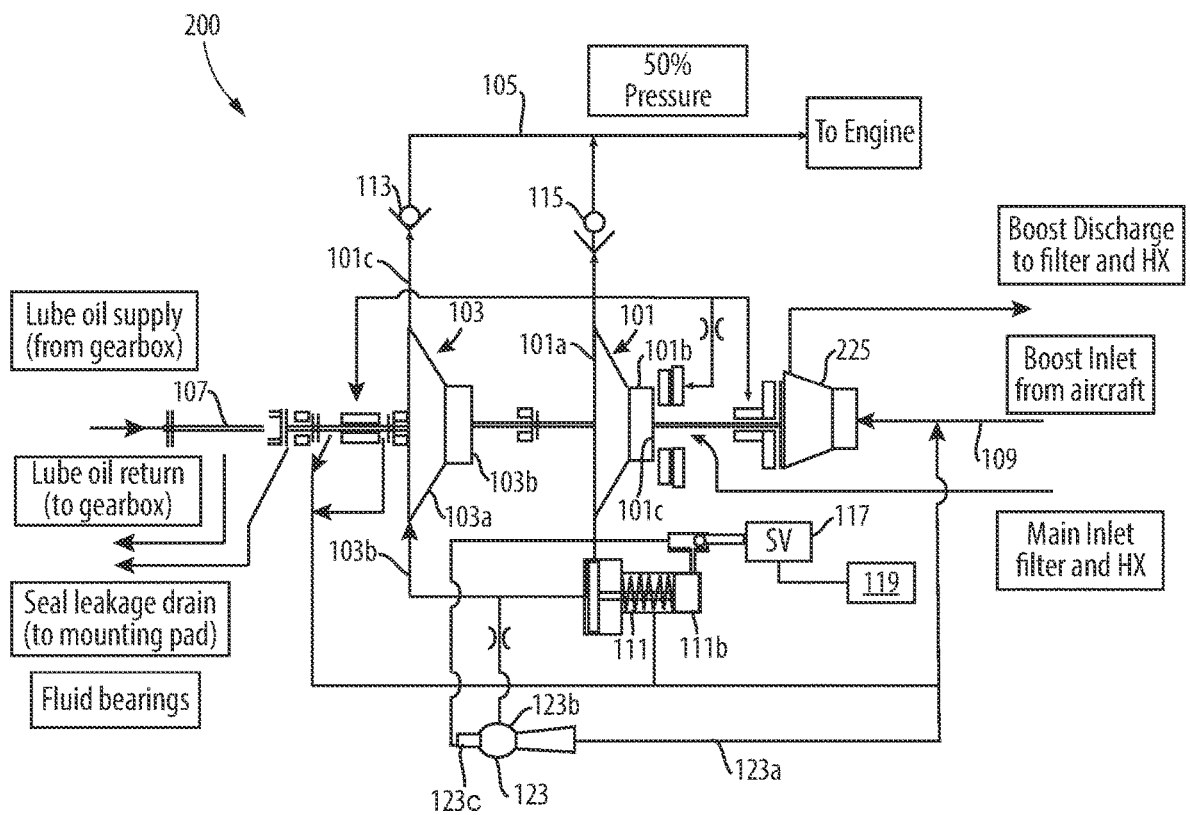
FIG. 2B is a schematic view of the embodiment of FIG. 2A, showing a first stage mode operation.

Referring additionally to FIGS. 2A and 2B, in certain embodiments, another embodiment of a system 200 is shown. The system 200 is similar to the embodiment of a system 200 of FIGS. 1A and 2A, however, the system 200 is shown having a boost pump 225 upstream of the first stage inlet 101*b* to boost an inlet flow pressure to the first stage 101. The boost pump 225 can be configured to receive flow from a source (e.g., main inlet line 109) and boost the pressure thereof. The boost pump 225 can be in fluid communication with one or more other system components, e.g., a filter and/or heat exchanger, upstream of the first stage 101. Embodiments with a boost pump can provide redundant priming pressure to the main pump stages, and can also provide pressure for filtering and the heat exchanger. As shown, in certain embodiments, all stages can be on the same shaft (e.g., a high speed shaft of a turbomachine). The boost pump 225 can thus also be a centrifugal pump as it is on the high speed shaft, sized to sufficiently provide boost pressure in all phases of operation.

The boost flow can be first sent to a heat exchanger and filter, then to first stage. In certain embodiments with a boost pump, the system may not be able to be run as fast as an embodiment without the boost stage as it may overpressure depending on sizing. However, moving the boost pump a high speed shaft allows elimination of a gear box traditionally used for a positive displacement type boost pump.

Any other suitable fluid circuit components (e.g., for fuel circuits) are contemplated herein. Any other suitable arrangement of the flow systems 100, 200 and/or any other suitable lines (e.g., for lubrication for bearings, etc.) is contemplated herein.

Figure 3:
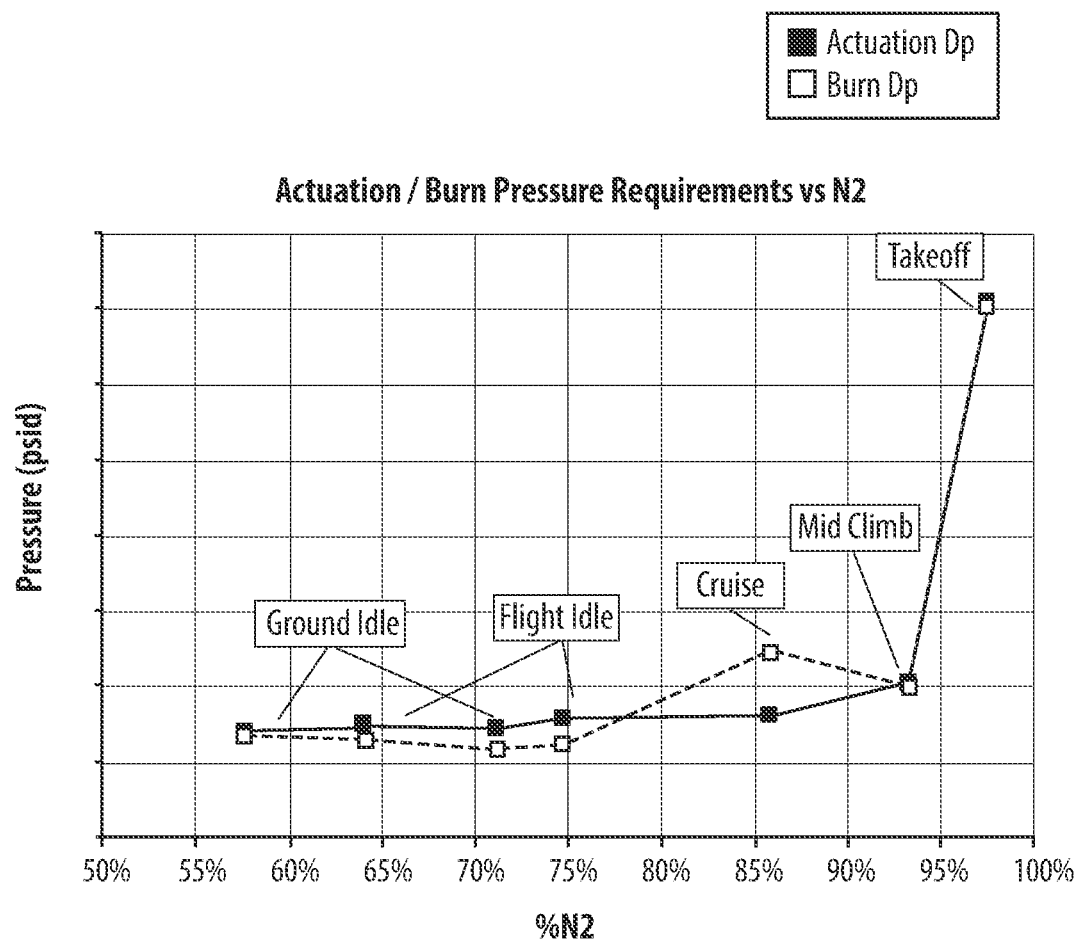
FIG. 3 is a chart showing actuation pressure and burn pressure requirements as a function of % N2 (i.e., engine speed).
Figure 4:
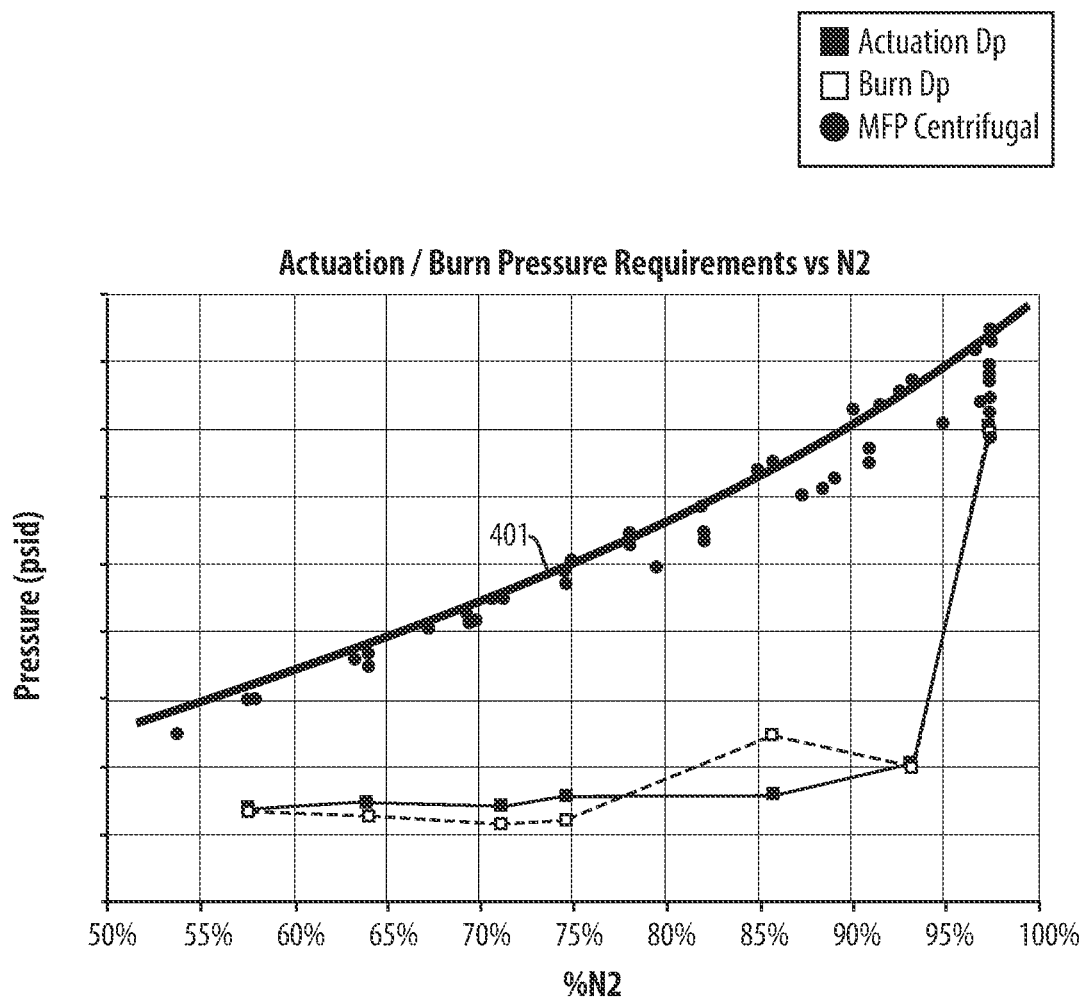
FIG. 4 is the chart of FIG. 3, also having a representative pressure of the main discharge line in a constant multi-stage mode.

FIG. 3 is a chart showing actuation pressure and burn pressure requirements as a function of % N2 (i.e., engine speed). As shown in FIG. 3, the various stages of flight correlate to different pressure requirements, with takeoff (full power) being the highest on the chart. FIG. 4 is the chart of FIG. 3, also having a representative pressure 401 of the main discharge line 105 in a constant multi-stage mode (or showing a representation of a single stage oversized centrifugal pump). The pressure generated in this type of operation consistently is more than required and is inefficient.

Figure 5:
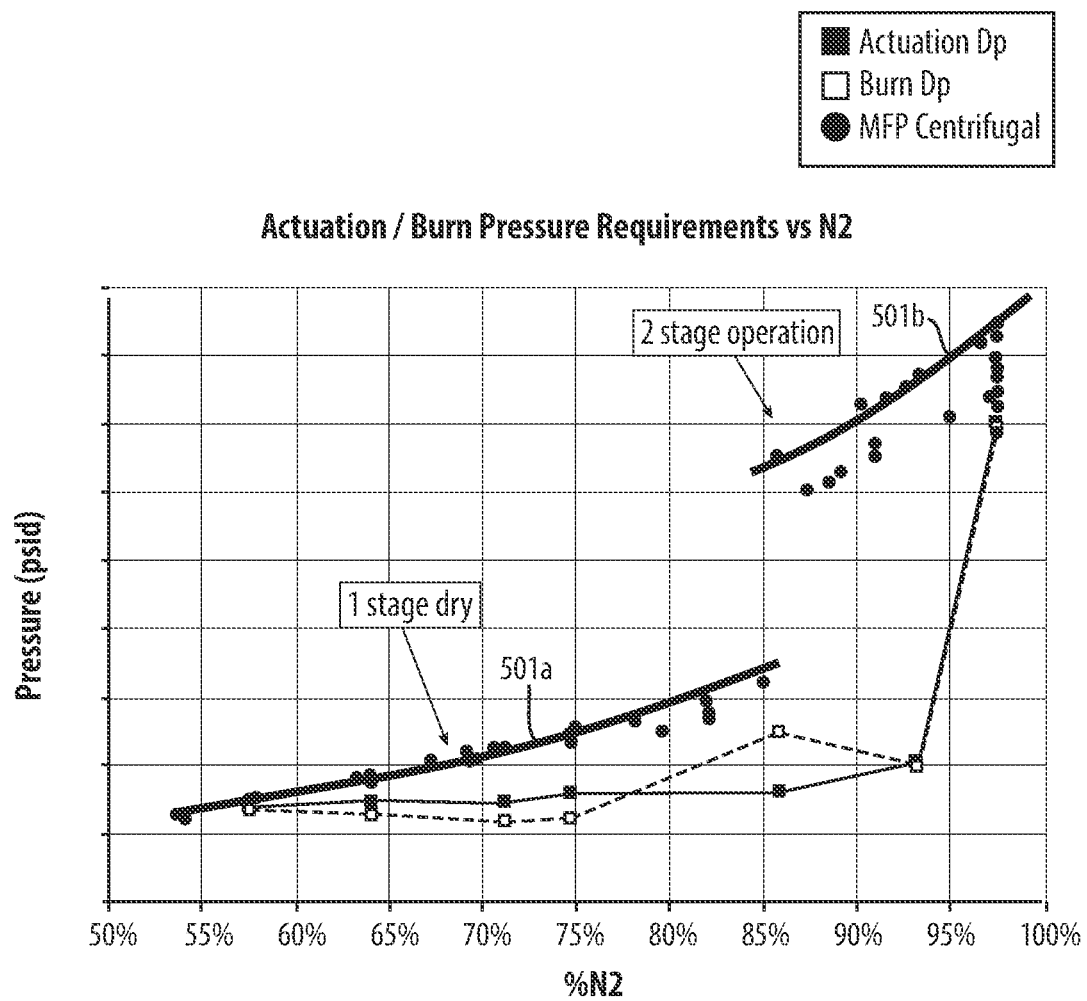
FIG. 5 is the chart of FIG. 3, also having a representative pressure of the main discharge line when the multi-stage system is operated in two separate modes, starting with single stage mode at lower pressure demand, and multi-stage mode at higher pressure demand.

FIG. 5 is the chart of FIG. 3, also having a representative pressure 501*a*, 501*b* of the main discharge line 105 when the multi-stage system 100, 200 is operated in two separate modes, starting with single stage mode at lower pressure demand (e.g., idle and cruise), and multi-stage mode at higher pressure demand (e.g., takeoff and climb). As shown in FIG. 5, the pressure generated can be modified to be lower by turning off the second stage 103 when during lower pressure requirements. The control module 119 can be configured to control the pressure output to ensure that the output pressure stays at least at or above the amount of pressure required. For example, as shown in FIG. 5, the control module 119 can switch the system 100, 200 to from multi-stage mode to a single stage mode (or lesser stage mode) at about the cruise power setting (e.g., as shown in FIG. 3, about 86% speed). The drag on the pump shaft and thus the driving components can be reduced or eliminated by drying out the second stage and/or other stages, allowing efficient use of multiple centrifugal pumps, for example.

The efficiency of the main pump at cruise and idle is of primary importance because these operating conditions represent a large percentage of the flight envelop. Required burner flows and pressures at cruise and idle conditions are only a fraction of those needed at takeoff. FIG. 3 shows the typical burn and actuation pressure requirements as a function of engine speed.

A centrifugal main pump can be sized to meet the flow and pressure requirements from the takeoff condition. For every other operating condition, its flow output can be controlled by the fuel metering module and its pressure output and power intake are derived from the affinity laws presented in the following formulae as based on speed and fuel density:

$$Q = Q_{base} \cdot \left(\frac{N}{N_{base}}\right) \Delta p = \frac{\rho}{\rho_{base}} \cdot \left(\frac{N}{N_{base}}\right)^2 \cdot \Delta p_{base} P = \frac{\rho}{\rho_{base}} \cdot \left(\frac{N}{N_{base}}\right)^3 \cdot P_{base}$$

Subscript "base" relates to pump performance at the rated speed and density, which typically is the takeoff condition and parameters with no subscript relate to the pump output at any other operating speed N. A centrifugal pump pressure rise performance sized for the conditions shown at FIG. 3 is presented in FIG. 4, for example.

While centrifugal pumps are an attractive solution for aircraft applications because of their light weight, reduced cost, low maintenance, and high reliability they are not that competitive against positive displacement and variable positive displacement pumps in terms of the power draw at partial flow conditions such as idle and cruise. Embodiments address that shortcoming. FIG. 4 shows that a centrifugal pump sized to meet the high pressure demand associated with the takeoff condition provides excess pressure rise at idle and cruise conditions. The pump power draw is proportional to the pressure rise output. To reduce the power draw and improve the competitiveness of a centrifugal pump used as a main fuel pump, embodiments herein are disclosed.

In certain embodiments, a centrifugal pump is designed as a multi-stage device with at least two stages, however any suitable number of stages is contemplated herein. In certain embodiments, the two stages are sized to about the same pressure rise, or any other ratio that appears beneficial. One of the stages can be provided with capabilities of being isolated and dried out based on signals received from the engine controller (e.g., being or including control module 119) sent to a pump mounted solenoid valve. In certain embodiments, the solenoid valve opens or closes a line that sends motive pressure to an inlet shutoff valve that is positioned at the inlet of the stage designated to go dry.

The motive pressure can be taken from the discharge of a stage that operates always wet. A pair of check valves can be located in each of the stages discharge ports and can allow the output of one or both stages to be sent to the engine fuel control module. An ejector that receives motive flow from the wet stage can be used to bring the dry stage to a complete vacuum when commanded to dry operation. In this way the pump input power at cruise and idle is cut in half and its efficiency doubled.

FIG. 5 shows the pump output with one stage commanded to dry for idle and cruise and both stages running wet for climb and takeoff. FIGS. 1A-2B illustrate two modes of operation, both stages wet for takeoff and climb, and one stage dry for cruise, ground idle, and idle descent in the power saving mode, for example. Any other suitable modes and/or uses of operation are contemplated herein.

Traditional engine fuel system typical architecture includes a low speed centrifugal pumping element called a boost stage. Its function can be to provide sufficient pressure rise to cover for pressure losses in the filter and heat exchangers and still maintain sufficient pressure at the inlet of the main pump to ensure its normal operation and to do so under the lowest inlet conditions such as TVP (true vapor pressure)+3.5 psia and/or V/L (vapor over liquid ratio) of 0.45 two phase flow. In case the main fuel pump is of positive displacement type, which typically runs at lower speeds, the boost stage can be directly coupled and driven by it.

Using a centrifugal pump as a main pump in a fuel system and taking advantage of its benefits in terms of weight and cost requires a running speed a couple of times larger than what is typically used for positive displacement pump types. That requires a high speed pad on the AMAD, engine mounted accessories gearbox. The removal of the positive displacement main fuel pump leaves the boost stage on a low speed pad, which represents an extra cost and weight penalty for the fuel system as a whole. Certain embodiments disclosed herein can optimize the system for weight and cost by placing the boost stage element on a high speed shaft of the main centrifugal pump.

Certain embodiments can include a multi-stage centrifugal pump system configured for use as main fuel pump on a jet engine with capabilities of drying out on demand some of its stages to save power at idle and cruise by reducing the pressure rise output to the minimum required by the engine fuel and actuation system. Certain embodiments can include a high speed boost stage to save weight and cost and eliminate the need for two driving pads on AMAD (engine mounted accessories gearbox).

In accordance with at least one aspect of this disclosure, a fuel system for an aircraft can include a multi-stage fluid pump system as disclosed herein, e.g., systems 100, 200 as described above. The fuel system can include any other suitable components as appreciated by those having ordinary skill in the art in view of this disclosure.

In accordance with at least one aspect of this disclosure, a non-transitory computer readable medium can have computer executable instructions configured to cause a computer to perform a method. The method can include opening an inlet shut off valve directly or indirectly to cause multi-stage pumping in a multi-stage mode in a first operating condition, closing the inlet shut off valve directly or indirectly to prevent at least a second stage from pumping but to continue to allow first stage pumping in a first stage pumping mode, and keeping the inlet shut valve closed to cause draining of at least the second stage to reduce or eliminate fluid drag on the second stage.

Embodiments can be utilized with aircraft jet engine fuel systems, for example, in particular as the main fuel pumps. Advanced aircrafts of today dispose of heat generated by a variety of electronic and mechanical systems into the fuel that is sent to the burners (e.g., the combustor). New engine fuel system requirements demand better, and better, fuel pump efficiencies, such that to minimize the contribution of these components to the heat load. Complex jet engine fuel systems may consist of a couple of pumps, each serving specific functions such as delivering burn flow, actuation flow, or after burner flow. The pump delivering the burner flow is called the main pump and it is traditionally a positive displacement. In addition to providing burner flow, the main pump also supplies motive flow to the engine fuel driven actuators used to set and hold the compressor guiding vanes at predetermined positions, for example.

As described above, embodiments can include a high efficiency multi-staged centrifugal main fuel pump with a "run dry" capability. Embodiment can include an engine mounted multi-stage centrifugal fuel pump with capabilities of drying out one, or more stages, to reduce the pump power at idle and cruise conditions. The power reduction can make this type of pump equal to the positive displacement pumps currently in use for this function with the added benefits of being lighter, less expensive, having longer life on wing, and more reliable than positive displacement pumps. In embodiments, a multi-stage centrifugal pump can have at least two stages. One of the stages is provided with capabilities of being dried out. A solenoid valve can open or close a line that sends motive pressure to an inlet shutoff valve that is positioned at the inlet of the stage designated to go dry. The motive pressure can be taken from the discharge of the wet stage. A pair of check valves can be located in each of the stages discharge ports allows the output of one, or both stages be sent to the engine fuel control module. An ejector that can receive motive flow from the wet stage and be used to bring the dry stage to a complete vacuum when commanded to dry operation. In this way the pump input power at cruise and idle can be cut in half and its efficiency doubled (e.g., assuming two stages and each stage is the same size). Embodiments can bring the centrifugal pump power draw equal to or better than that of the traditional positive displacement pumps, thereby enabling the use of centrifugal pumps for main fuel pumps (e.g., for turbomachines).

To date, centrifugal main fuel pumps had an advantage over their positive displacement counterparts on weight, cost, and reliability, but not on the power consumption at lower flows such as those from idle and cruise conditions. That disqualified such pumps from being used as fuel pumps, e.g., for aircraft. Embodiments make the power consumption of a centrifugal pump with partial drying option equal to that of a positive displacement pump and still keep the weight, cost and reliability advantage of centrifugal pumps.

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least o1ne) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A multi-stage fluid pump system, comprising:
a first stage configured to provide a first pressure;
a second stage configured to provide a second pressure, wherein the first stage is upstream of the second stage, wherein the pump system is configured to:
prevent output of the second stage in a first stage mode such that only the first pressure is output from the first stage and second stage;
allow output of the second stage in a multi-stage mode such that there is a combined pressure output from the first stage and the second stage; and
a first check valve disposed downstream of the first stage at a first stage outlet between the first stage and a main discharge line; wherein the first stage and the second stage are driven by a common shaft, wherein the system further comprises an ejector pump in fluid communication between the first stage and a main inlet line.

2. The system of claim 1, wherein the system is configured to reduce or eliminate a resistance provided by the second stage in the first stage mode.

3. The system of claim 2, wherein the system is configured to dry out the second stage in the first stage mode to reduce or eliminate fluid drag on the second stage.

4. The system of claim 3, wherein the first stage is a centrifugal pump, wherein the second stage is also a centrifugal pump.

5. The system of claim 3, further comprising a bleed path in fluid communication with the second stage to drain the second stage in the first stage mode.

6. The system of claim 5, wherein the bleed path is in fluid communication with a negative pressure port of the ejector pump to dry out the second stage.

7. The system of claim 1, further comprising an inlet shutoff valve downstream of the first stage between a first stage outlet and a second stage inlet, wherein the inlet shutoff valve is configured to block flow to the second stage inlet in the first stage mode, and wherein the inlet shutoff valve is configured to allow the flow to the second stage in the multi-stage mode.

8. The system of claim 7, wherein the first check valve configured to open in the first stage mode to allow the first stage to output flow to the main discharge line, and to be closed in the multi-stage mode to prevent flow to the main discharge line.

9. The system of claim 8, further comprising a second check valve disposed downstream of the second stage at a second stage outlet between the second stage and the main discharge line, the second check valve configured to open in the multi-stage mode to allow the second stage to output flow to the main discharge line, and to be closed in the first stage mode to prevent fluid communication between the second stage and the main discharge line.

10. The system of claim 9, wherein the inlet shutoff valve is a pressure actuated valve having a first side where flow passes through and a second side where control pressure is received, the system further comprising a solenoid valve in fluid communication with the first stage outlet to selectively communicate the first pressure to the second side of the inlet shutoff valve to close the inlet shutoff valve, wherein the inlet shutoff valve is configured to close when the first pressure is applied to a second side.

11. The system of claim 10, further comprising a control module operatively connected to the solenoid valve to control the solenoid valve, and thus indirectly control a position of the inlet shut off valve.

12. The system of claim 1, further comprising a boost pump upstream of a first stage inlet to boost an inlet flow pressure to the first stage.

13. A fuel system for an aircraft, comprising: a multi-stage fluid pump system, comprising:
a first stage configured to provide a first pressure;
a second stage configured to provide a second pressure, wherein the first stage is upstream of the second stage, wherein the pump system is configured to:
prevent output of the second stage in a first stage mode such that only the first pressure is output from the first stage and second stage; and
allow output of the second stage in a multi-stage mode such that there is a combined pressure output from the first stage and the second stage; and
a first check valve disposed downstream of the first stage at a first stage outlet between the first stage and a main discharge line, wherein the first stage and the second stage are driven by a common shaft, wherein the system further comprises an ejector pump in fluid communication between the first stage and a main inlet line.

14. The fuel system of claim 13, wherein the multi-stage fluid pump system is configured to reduce or eliminate a resistance provided by the second stage in the first stage mode.

15. The fuel system of claim 14, wherein the multi-stage fluid pump system is configured to dry out the second stage in the first stage mode to reduce or eliminate fluid drag on the second stage.

16. The fuel system of claim 15, wherein the first stage is a centrifugal pump, wherein the second stage is also a centrifugal pump.

\* \* \* \* \*